United States Patent [19]

Tannhäuser

[11] 4,142,065
[45] Feb. 27, 1979

[54] METHOD FOR BIT-SYNCHRONOUS TRANSMISSION OF DATA

[75] Inventor: Armin Tannhäuser, Munich, Fed. Rep. of Germany

[73] Assignee: Siemens Aktiengesellschaft, Munich, Fed. Rep. of Germany

[21] Appl. No.: 585,494

[22] Filed: Jun. 10, 1975

[30] Foreign Application Priority Data

Jun. 12, 1974 [DE] Fed. Rep. of Germany ....... 2428370

[51] Int. Cl.² .............................................. H04L 7/02
[52] U.S. Cl. ...................................... 178/69.1; 178/68
[58] Field of Search ............ 178/66 R, 67, 68, 69.5 R; 325/38 A

[56] References Cited

U.S. PATENT DOCUMENTS 3,343,091  9/1967  Bruglemans ........................ 178/67 X
3,863,025  1/1975  Gonsewski et al. .................. 178/68

Primary Examiner—Benedict V. Safourek
Attorney, Agent, or Firm—Schuyler, Birch, Swindler, McKie & Beckett

[57] ABSTRACT

A method for transmitting data in bit-synchronous fashion using a binary signal whose bit transitions appear in the middle of each bit interval is described. Signals are assigned to certain bits forming a composite signal for transmission. For the durations of the bits, after every quarter bit period and after every three quarter bit period, the amplitudes of the assigned signals exceed a predetermined threshold value. For the durations of bits having no signals assigned thereto, the values of the assigned signals do not exceed the threshold values. After half bit and whole bit periods, the values of the assigned signals equal zero.

3 Claims, 5 Drawing Figures

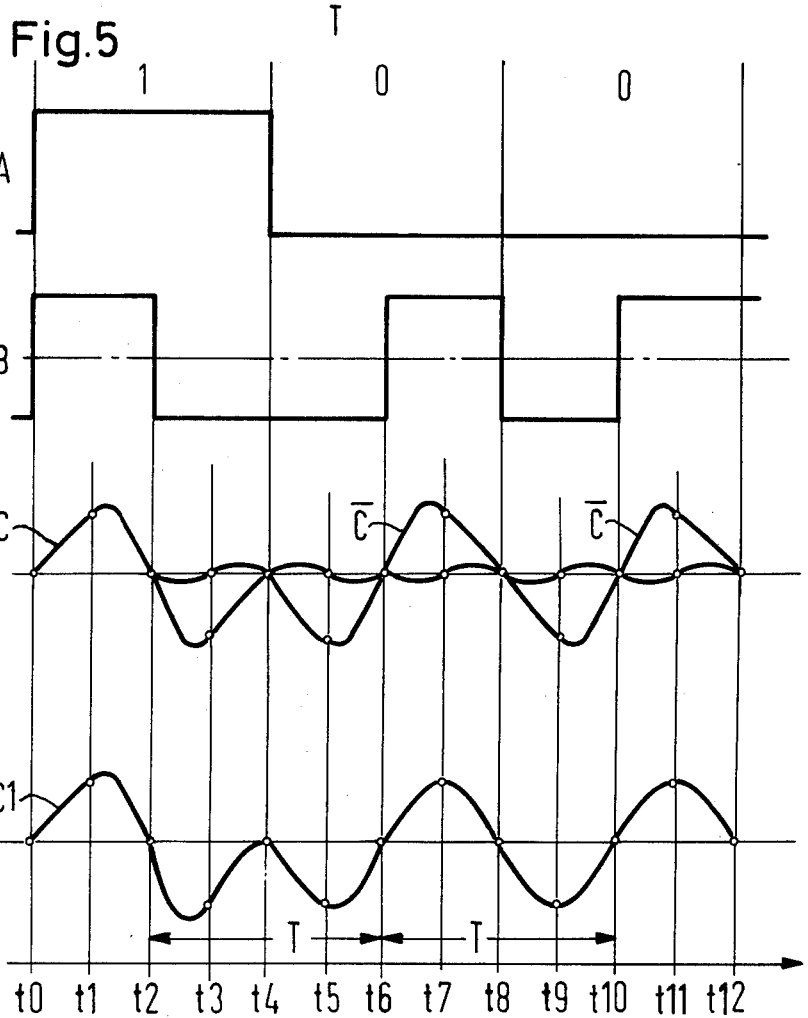

METHOD FOR BIT-SYNCHRONOUS TRANSMISSION OF DATA

BACKGROUND OF THE INVENTION

The invention relates to a method for the transmission of data, particularly in a bit-synchronized manner, by means of a binary signal whose bit transitions appear in the middle of each bit interval and signal the individual bits, whereupon signals are assigned to the bits, and a composite signal is transmitted which is made up of the superimposed signals.

As is generally known, data can be transferred by means of a binary signal, whose bit transitions appear in the middle of each bit interval and which is composed of rectangular pulses, whose duration is either a half bit period or a whole bit period. Such a binary signal is particularly suited for pulse synchronization, because the zero crossings, or bit transitions, of the binary signal have no greater time intervals than the bit period. However, through band limitation of the binary signal, the zero crossings thereof can be shifted causing disturbances in the pulse synchronization.

An object of the invention is to provide a method for transferring an information bearing binary signal such that the time intervals of the zero crossings remain constant.

SUMMARY OF THE INVENTION

In accordance with the invention, the foregoing and other objects are attained in a method wherein throughout the durations of the assigned bits, after every quarter bit period and after every three-quarter bit period, the pulse amplitudes exceed a predetermined threshold value, while for the duration of the unassigned bits the pulse amplitudes do not exceed the threshold values. Moreover, the pulse amplitudes are zero after a half bit period and after a whole bit period.

The transmission quality can be improved by use of the method according to the invention, thereby extending the range of system employing bit-synchronous baseband transmission. This is particularly accomplished through precise pulse synchronization, through reduced sensitivity with regard to signal distortions caused by the communication channel, which results in an extension of the pulsing range.

It is of advantage when throughout the durations of the unassigned bits, after a quater bit period and after a three-quater bit period, the pulse amplitudes are zero. In this way, the information transmitted with the data can be obtained, not only as a result of the bit transitions, but also with the aid of information bearing amplitudes.

BRIEF DESCRIPTION OF THE DRAWINGS

The principles of the invention will be more readily understood by reference to the description of a preferred embodiment of apparatus for carrying out the inventive method given hereinbelow in conjunction with the five figures of drawings, wherein like reference characters designate like parts.

FIG. 4 is a diagram illustrating a frequency function of the signal assigned to the information bearing bit transitions.

FIG. 5 is a time-waveform diagram showing signals appearing in the data transmission system shown in FIG. 1.

DETAILED DESCRIPTION OF THE DRAWINGS

Figure 1:
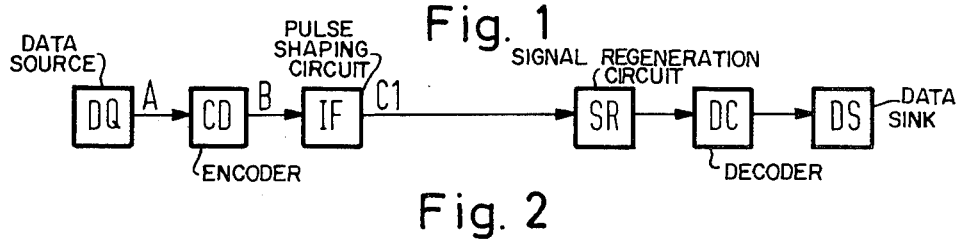
FIG. 1 is a block-schematic diagram of a bit-synchronous data transmission system which can be used for performing the method of the invention.

The data transmission system shown in FIG. 1 comprises a data source DQ, an encoder CD, a pulse-shaping circuit IF, a signal regeneration circuit SR, a decoder DC and a data sink DS. The data source DQ, may for example, be a computer, a keyboard input unit, a teletypewriter, or a tape reader. The data sink DS, for example, might be a teletypewriter, a printer, a tape punch, or a data storage. The remainder of the circuitry used in the illustrated system is similarly well known. For example, for the encoder CD it is necessary only to provide a conventional coder capable of encoding signal A to arrive at signal B in accordance with the well known diphase technique. The pulse shaping circuit IF, as discussed hereinbelow, need only be a filter capable of producing output parameters as described in connection with FIG. 3. The signal regeneration and decoding circuits are of the well known type capable of regenerating class 4, partial response data signals, as described, for example, in FIG. 5 of U.S. Pat. No. 3,508,153.

Figure 2:
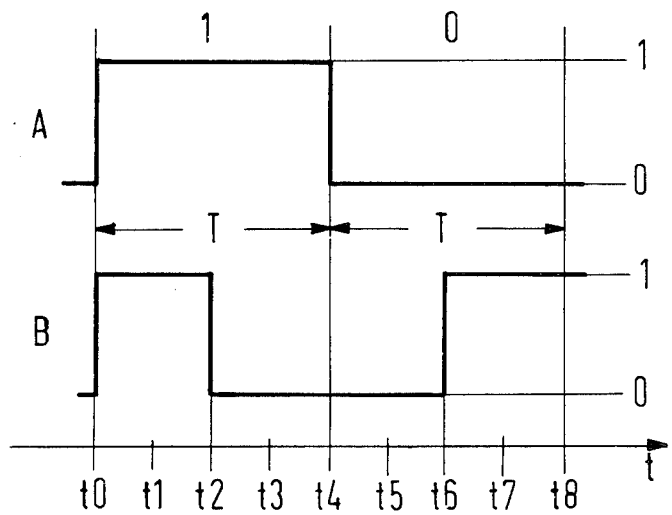
FIG. 2 is a time-waveform diagram showing the data to be transmitted and appropriate binary signals.

FIG. 2 shows several signals whose bits are identified by the reference numerals 1 and 0. The directions of abscissas refer to the time t. From the data source DQ the data are transferred in bit-synchronous fashion to the encoder CD in the form of signal A. Thus, a bit frame is preassigned, where bit 1 is the first bit of the signal A that starts at the instant t0 and ends at the instant t4, while bit 0 is the succeeding bit that commences at the instant t4 and ends at the instant t8.

Code conversion occurs by means of the encoder CD, the signal B being obtained by using what is known as the normal diphase method. The individual bits are assigned bit transitions appearing at instants t2 and t6 in the middle of the bit interval. Signal B consists of rectangular pulses having a duration equaling either the bit period T or half the bit period, T/2. The zero crossings of the signal B have no greater time intervals than the bit period T. Instead of the signal B, a signal can be obtained with the encoder CD by use of the coded diphase method.

As signal B is being transmitted, an accurate pulse synchronization can be performed in the area of the decoder DC, it being assumed, however, that the time intervals of the zero crossings of the signal B are not altered substantially by the pulse-shaping circuit IF shown in FIG. 1.

To ensure that the zero crossings used for the pulse synchronization follow at constant intervals, the bit transitions of the signal B appearing at instants t2 and t6 are assigned a signal C1, by means of the pulse-shaping circuit IF. The time function C of signal C1 is depicted in FIG. 3 and the frequency function in FIG. 4.

Figure 3:
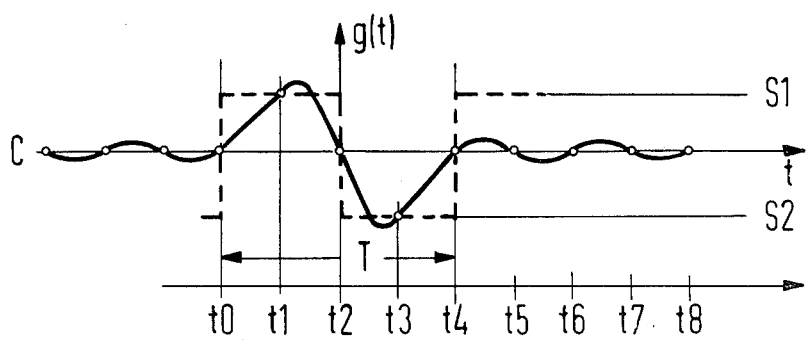
FIG. 3 is a diagram illustrating a time function of a signal assigned to the information bearing bit transitions.

It is assumed, as shown in FIG. 2, that the bit A=1 starting at instant t0 and ending at instant t4, is assigned the signal C illustrated in FIG. 3. After a quater bit period and, hence, at instant t1, the strength of the signal C exceeds the prespecified threshold value S1. It is likewise apparent that after a three-quarter bit period, at instant t3, the strength of the signal C exceeds the threshold value S2.

The bit of signal A beginning at instant t4 and ending at instant t8 is not assigned to the signal C shown in FIG. 3. Throughout the duration of the unassigned bit, i.e., from instant t4 to instant t8, the strength of the signal C remain below the predetermined threshold values S1 and S2. The strength of the signal C is zero after a half bit period, i.e., at instants t2 and t6, and after a whole bit period, i.e., at instants t0, t4 and t8. Even after a quarter bit period, at instant t5, and after a three-quarter bit period, at instant t7, the strength of the signal C is zero for the duration of the unassigned bit.

The time function of FIG. 3 can be shown by approximation in the following equation:

$$g(t) = \frac{2}{\pi} \cdot \frac{\sin \frac{4\pi}{T} t}{(\frac{4}{T} t)^2 - 1}$$

FIG. 4 shows the frequency function of the signal C. The curve therein has a sinusoidal shape. The frequency function G(w) can be shown by approximation in the following equation:

$G(w) = j(T/2) \sin w(T/4)$; for $|w| \leq (4\pi/T)$
$G(w) \leq 0$; for $|w| > (4\pi/T)$ The time function g(t) corresponds in form to the partial response pulse of class 4. However, in constrast to the partial response method, the information-bearing principal values of the signals C appearing at instants t1 and t3 are not superimposed, since the signals C, which are assigned to other bits of the signal A, are zero at instants t1 and t3. Therefore, also in the signal received from the receiving unit illustrated in FIG. 1 only two signal states are essential for each bit, and no more signal states are developed as in the case of the partial response method. With the same bit rate 1/T, the signal C has a spectrum four times as broad as the corresponding partial response pulse of class 4.

FIG. 3 shows the signal C for the bit A=1. The bit A=0 is assigned the signal $\overline{C}$ which, in comparison to the signal C, is mirrored on the axis g(t).

FIG. 5 illustrates the signals B, C, $\overline{C}$ assigned to the bits 1, 0, 0. In the case of the signal B, the bit A=1 is assigned the signal C, whose information-bearing amplitudes appear at the instants t1 and t3 and whose overshoots are likewise shown after the instant t4. The signal $\overline{C}$ is assigned to the bit A=0. It is assumed that the signals C and $\overline{C}$ are superimposed so that the signal C1 is transmitted over the output of the pulse-shaping circuit IF. The signal C1 is available in the area of the signal-regeneration circuit SR, the zero crossings of the signal occurring at the instants t2, t6 and t10 after each bit period T.

A filter may be provided, for example, to serve as a pulse-shaping circuit IF. The frequency curve of the filter equals the product of the frequency curve G(w) of the signal C or of the signal $\overline{C}$ and the reciprocal value of the frequency curve of the binary signal B.

The description hereinabove is of an example of apparatus capable of carrying out the method of the invention and is an application of the principles of the invention to that particular apparatus. It is contemplated that the form or construction of the apparatus used to practice the invention can be modified or changed, as can the signal values used, while remaining within the scope of the invention as defined by the appended claims.

I claim:

1. A method for the bit-synchronous transmission of binary data comprising the steps of:

generating said binary data having a plurality of first and second binary bits representing, respectively, first and second binary conditions, producing a first assigned signal corresponding to a first binary bit of said binary data, said first assigned signal having an amplitude during the first half of the duration of said first binary bit which exceeds a predetermined first threshold value and an amplitude during the second half of the duration of said first binary bit which exceeds a predetermined second threshold value, the amplitude of said first assigned signal being within said first and second threshold values for the durations of the other bits constituting said binary data, said first assigned signal having a zero value at one-half of the duration of said first binary bit and at the end of the duration of said first binary bit, producing a second assigned signal corresponding to a second binary bit, said second assigned signal being the inverse of said first assigned signal and having an amplitude during the first half of the duration of said second binary bit which exceeds said predetermined second threshold value and at an amplitude during the second half of the duration of said second binary which exceeds said predetermined first threshold value, the amplitude of said second assigned signal being within said first and second threshold values for the durations of the other bits constituting said binary data, said second assigned signal having a zero value at one-half of the duration of said second binary bit and at the end of the duration of said second binary bit, forming a composite signal by superposing in sequence said first and second assigned signals in accordance with the bit sequence of the binary data being transmitted and transmitting said composite signal.

2. The method defined in claim 5 wherein said producing steps include generating waveforms for said assigned signals such that for the durations of said other bits, after a quarter bit period and after a three-quarter bit period the amplitudes of the assigned signals are zero.

3. The method defined in claim 1 wherein said producing steps produce assigned signals that are defined by approximation of the time function:

$$g(t) = \frac{2}{\pi} \cdot \frac{\sin \frac{4\pi}{T} t}{(\frac{4}{T} t)^2 - 1}$$

and by the frequency function:
$G(w) = j(T/2) \sin w (T/4)$; for $|w| \leq (4\pi/T)$
$G(w) = 0$; for $|w| \leq (4\pi/T)$
where:
t = time
T = bit period

* * * * *